(12) United States Patent
Brunnmair et al.

(10) Patent No.: US 10,611,686 B2
(45) Date of Patent: Apr. 7, 2020

(54) METHOD AND DEVICE FOR PRODUCING AN EXPANDED GRANULATE

(71) Applicant: BINDER + CO AG, Gleisdorf (AT)

(72) Inventors: Ernst Erwin Brunnmair, Graz (AT); Gerhard Salchinger, Sinabelkirchen (AT)

(73) Assignee: BINDER + CO AG, Gleisdorf (AT)

( * ) Notice: Subject to any disclaimer, the term of this patent is extended or adjusted under 35 U.S.C. 154(b) by 53 days.

(21) Appl. No.: 15/579,436

(22) PCT Filed: Jun. 2, 2016

(86) PCT No.: PCT/AT2016/050175
§ 371 (c)(1),
(2) Date: Dec. 4, 2017

(87) PCT Pub. No.: WO2016/191788
PCT Pub. Date: Dec. 8, 2016

(65) Prior Publication Data
US 2018/0141862 A1   May 24, 2018

(30) Foreign Application Priority Data
Jun. 3, 2015 (AT) .......................... GM 50108/2015

(51) Int. Cl.
*C04B 20/00* (2006.01)
*F23J 15/02* (2006.01)
(Continued)

(52) U.S. Cl.
CPC ............ *C04B 20/066* (2013.01); *F27B 1/005* (2013.01); *F27B 1/20* (2013.01); *F27B 1/22* (2013.01);
(Continued)

(58) Field of Classification Search
CPC ..... C04B 20/066; C04B 9/045; F26B 17/101; F23J 15/022; F23J 15/025; F27B 1/00;
(Continued)

(56) References Cited

U.S. PATENT DOCUMENTS

| | | | | |
|---|---|---|---|---|
| 2,421,902 A | * | 6/1947 | Neuschotz | .......... C03B 19/1085 252/378 P |
| 2,431,884 A | * | 12/1947 | Neuschotz | ............ C04B 20/066 252/378 P |
| 3,097,832 A | * | 7/1963 | Murdock | .............. C04B 20/066 252/378 R |
| 3,955,915 A | * | 5/1976 | Buchner | ................... C04B 2/12 432/17 |

(Continued)

FOREIGN PATENT DOCUMENTS

WO    WO1992006051 A1    4/1992
WO    WO2013053635 A1    4/2013

*Primary Examiner* — Gregory A Wilson
(74) *Attorney, Agent, or Firm* — Nguyen Tarbet

(57) ABSTRACT

The invention relates to a method for producing an expanded granulate (29) made of a sand grain-shaped mineral material (1) using a propellant; wherein the material (1) is fed to a substantially upright furnace (2); wherein the material (1) is conveyed along a conveying path (4) through a plurality of vertically separated healing zones (5) in a furnace shaft (3) of the furnace (2), wherein each heating zone (5) can be heated by at least one independently controllable heating element (6); wherein the material (1) is heated to a critical temperature at which the surfaces (7) of the sand grains (1) become plastic and the sand grains (1) are expanded through the propellant. It is provided according to the invention that the material (1) is fed together with an amount of air from below, wherein the material (1) is conveyed from bottom to top along the conveying path (4) by means of the amount of air which flows from bottom to top within the furnace shaft (3) and forms an air flow (14), and wherein the expanding of the sand grains (1) occurs in the upper half, preferably in the uppermost third, of the conveying path (4).

30 Claims, 2 Drawing Sheets

(51) Int. Cl.
| | |
|---|---|
| *C04B 20/06* | (2006.01) |
| *F27B 1/00* | (2006.01) |
| *F27B 1/20* | (2006.01) |
| *F27B 1/22* | (2006.01) |
| *F27B 1/24* | (2006.01) |
| *F27D 3/18* | (2006.01) |
| *F27D 99/00* | (2010.01) |

(52) U.S. Cl.
CPC .......... *F27B 1/24* (2013.01); *F27D 2003/185* (2013.01); *F27D 2099/0086* (2013.01)

(58) Field of Classification Search
CPC .... F27B 1/005; F27B 1/20; F27B 1/22; F27B 1/24; F27D 3/0033; F27D 3/10
See application file for complete search history.

(56) References Cited

U.S. PATENT DOCUMENTS

| | | | | |
|---|---|---|---|---|
| 4,318,691 | A * | 3/1982 | Strong | F27B 15/00 252/378 P |
| 4,347,155 | A * | 8/1982 | Jenkins | C04B 20/066 252/378 P |
| 4,602,962 | A * | 7/1986 | Fehlmann | C04B 20/06 106/405 |
| 5,002,696 | A * | 3/1991 | White | B01J 6/008 106/409 |
| 5,580,241 | A * | 12/1996 | Koeberle | B01J 8/1845 432/100 |
| 2014/0291582 | A1* | 10/2014 | Brunnmair | C04B 38/009 252/378 R |
| 2018/0141862 | A1* | 5/2018 | Brunnmair | C04B 20/066 |

* cited by examiner

METHOD AND DEVICE FOR PRODUCING AN EXPANDED GRANULATE

FIELD OF THE INVENTION

The present invention relates to a method for producing an expanded granulate made of a sand grain-shaped mineral material using a propellent, for example, an expanded granulate of perlite or obsidian sand; wherein the material is fed to a substantially upright furnace; wherein the material is conveyed along a conveying path through a plurality of vertically separated heating zones in a furnace shaft of the furnace, wherein each heating zone can be heated by at least one independently controllable heating element; wherein the material is heated to a critical temperature at which the surfaces of the sand grains become plastic and the sand grains are expanded through the propellant; wherein the expanded material is discharged from the furnace.

The present invention further relates to a device for producing an expanded granulate of a sand grain-shaped material, comprising a substantially upright furnace with a furnace shaft having an upper end and a lower end, wherein a conveying path, which passes through a plurality of vertically separated heating zones, extends between the two ends, wherein the heating zones each have at least one independently controllable heating element to heat the material to a critical temperature and to expand the sand grains.

DESCRIPTION OF THE PRIOR ART

A method for the closed-cell expanding of mineral materials, in particular of sands of volcanic rocks such as perlite or obsidian, is known from AT 12878 U1. In this case, the expanding occurs on the basis of water bound in the material, which acts as a propellant when the sand grain-shaped material is heated in a shaft furnace to a critical temperature at which the surface of the sand grains becomes plastic. The material is fed from above into the furnace and, as a result of gravity, falls through a drop section into the furnace shaft.

Buoyancy forces occur in this case, which are influenced, inter alia, by the density of the material before and after the expansion process and by the chimney effect of the furnace shaft. They generally cause an increase in the dwell time of the material in the furnace shaft, which can also be exploited in part in order to selectively prolong the dwell time in the furnace shaft. Typically, raw grains of sand sizes between 100 μm and 700 μm can be expanded in this way.

However, significantly smaller grain sizes of the material to be expanded cannot be realized with the known method, since the sinking rate of the sand in the (gas-filled) furnace shaft decreases with lower grain size. From a certain minimum grain size, therefore, no even smaller particle sizes can be used for the known expansion process, since the buoyancy forces are too great for these even smaller grain sizes. This means that these sand grains are unable to get through the furnace shaft, which in particular leads to caking of the hot material on the furnace shaft. This means for example in turn that the fine material with grain sizes of less than 100 μm which inevitably occurs in the preparation of volcanic sands cannot be processed into a valuable end product in the form of expanded sand grains or microspheres, but merely represents useless waste.

OBJECT OF THE INVENTION

It is therefore an object of the present invention to provide an improved expansion method, which avoids the above-mentioned disadvantages and in particular allows the expansion of fine material, as well as a device for carrying out the improved method.

SUMMARY OF THE INVENTION

The core of the invention is to carry out the conveying of the sand grain-shaped material through the furnace shaft by means of an air flow, in that the material is fed together with an amount of air into the furnace shaft. In order to prevent the resulting buoyancy forces from causing the dwell time to become uncontrollably long, the conveying takes place by means of the air or air flow from bottom to top, i.e. against gravity. In this way it can be ensured that the expanding takes place only in the upper half, preferably only in the upper third of the furnace shaft, or a conveying path through the furnace shaft. This in turn makes it possible to avoid caking of the hot sand grains on an inner wall of the furnace shaft. Thus, since the dwell time of the already expanded sand grains can be kept correspondingly small, not only the caking on the inner wail of the furnace shaft, but also a gluing of the expanded sand grains can be reduced or prevented in a targeted manner, if this gluing should be avoided. In summary, therefore, fine material with diameters of less than 100 μm, which previously represented only waste in the process, can be processed into a valuable end product in the form of expanded microspheres.

Therefore, it is provided according to the invention in a method for producing an expanded granulate from sand grain-shaped mineral material with a propellant, e.g. an expanded granulate of pearlite or obsidian sand; wherein the material is fed to a substantially upright furnace; wherein the material is conveyed along a conveying path through a plurality of vertically separated heating zones in a furnace shaft of the furnace, wherein each heating zone can he heated by at least one independently controllable heating element; wherein the material is heated to a critical temperature at which the surfaces of the sand grains become plastic and the sand grains are expanded through the propellant; wherein the expanded material is discharged from the furnace, that the feeding of the material takes place together with an amount of air from below, wherein the material is conveyed from the bottom to the top along the conveying path by means of the amount of air which flows from the bottom to the top in the furnace shaft and forms an air flow, and wherein the expanding of the sand grains occurs in the upper half, preferably in the uppermost third, of the conveying path. This means in particular that the material, is added to the air flow in a conveying direction or in a direction of the air flow, as seen in the furnace shaft, before the first heating element. The discharge preferably takes place at the upper end of the furnace shaft.

Similarly, it is provided according to the invention in a device for producing an expanded granulate of a sand grain-shaped material, comprising a substantially upright furnace with a furnace shaft having an upper end and a lower end, wherein a conveying path extends between the two ends which passes through a plurality of vertically separated heating zones, wherein the beating zones each have at least one independently controllable heating element to heat the material to a critical temperature and to expand the sand grains, that a least one feeding means is provided in order to inject the unexpanded material together with an amount of air at the bottom of the furnace shaft in the direction of the upper end of the furnace shaft into the furnace shaft in such a way that the amount of air forms an upwardly flowing air flow, by means of which the material is conveyed from bottom to top along the conveying path in order to be expanded in the upper half, preferably in the uppermost third, of the conveying path. It would be conceivable for example to inject the amount of air by means of a nozzle into the furnace shaft and to feed the material separately, e.g. by means of a pipe attachment of the air flow emerging from the nozzle, preferably at the location of highest air velocity. In this case, the material can be fed in a metered manner, wherein both a volumetric and a gravitational feed of the material can be considered for metering.

Due to the finding that the expanding process is an isenthalpic process, which is accompanied by a temperature drop, the latter can be detected in a targeted manner. This in turn can be used to establish a temperature treatment of the expanded sand grains after the actual expansion process in order to influence the surface properties of the expanded sand grains. For example, a re-heating above the critical temperature can be prevented in order to prevent a rupture of the surface. Or such a renewed increase in temperature may be deliberately initiated, if a rupture of the surface of the sand grains should be consciously accepted or even intended. It is therefore provided in a preferred embodiment of the method according to the invention that upon detection of a first reduction in the temperature of the material between two successive positions along the conveying path, the heating elements along the remaining conveying path are controlled as a function of the critical temperature in order to prevent or enable in a targeted manner an increase in the material temperature along the remaining conveying path to or above the critical temperature.

Analogously, it is provided in a preferred embodiment of the device according to the invention that material temperature measuring means for direct and/or indirect measurement of the temperature and/or the change in temperature of the material are provided and a regulation and control unit connected to the material temperature measuring means and to the heating elements of the heating zones is to detect a first reduction in the temperature of the material, preferably at least 20° C., between two successive positions along the conveying path, and that the heating elements are controllable by the regulation and control unit depending on the critical temperature in order to prevent or enable in a targeted manner an increase in the material temperature along the remaining conveying path to or above the critical temperature.

Temperature sensors can be considered as material temperature measuring means, for example, which are arranged along the conveying path and can come into contact with the material or are provided only for the determination of the temperature in the furnace shaft in the respective heating zones, without coming into direct contact with the material.

Furthermore, the material temperature and in particular the material temperature change can be determined particularly easily indirectly by providing measuring devices for determining the power consumption of the heating elements as material temperature measuring means. In electrically operated heating elements, these measuring devices can be essentially limited to those for measuring the power consumption, wherein it is assumed that there is a known supply voltage. The temperature change of the material is made possible by determining the change in the heat flow from the heating elements to the material, which depends on the temperature difference between the heating elements and the material. During the heating of the material, the temperature difference between heating elements and material decreases successively. Accordingly, the heat flow decreases, i.e. the detected change in the heat flow from one heating zone to the next is initially a decrease. Accordingly, the power consumption of the heating elements along the conveying path initially decreases. Immediately after the expansion process and the concomitant fall in temperature, the temperature difference between the material and the heating elements is significantly greater than immediately before the expansion process. Accordingly, the heat flow increases, i.e. the observed change in the heat flow or the power consumption of the heating elements from one heating zone to the next is now an increase. This detected increase in the heat flow or the power consumption of the heating elements is therefore suitable for determining the temperature drop and its area in the furnace shaft.

Therefore, it is provided in a preferred embodiment of the method according to the invention that the temperature change of the material along the conveying path is measured indirectly by determining a power consumption, of the heating elements.

In a further preferred embodiment, the results of the temperature measurements are compared or factored in with the results of the determination of the power consumption of the heating elements arid thus the location of the expanding is detected in order to increase the accuracy of this detection. In this case, the temperature measurements can be carried out by means of temperature sensors, wherein it is not necessary to carry oat any direct temperature measurement of the material.

The very fine dust-like or sand grain-shaped material to be expanded is preferably processed before it is fed to the expansion process, since agglomerations are usually unavoidable in the conveying of the material. Such agglomerations are promoted by moisture of the material. If such agglomerates were expanded, agglomerates of expanded sand grains would be obtained, which is generally undesirable. Instead, the final product should normally concern single microspheres. Therefore, usually a drying process is provided in the preparation of the material.

But even in the dry state, the conveying of dust-like material is virtually impossible without agglomerations. For example, unwanted agglomerates are also formed when conveying dry dusty material by means of vibrating troughs. Therefore, it is provided according to the invention to disperse the material before the expansion process in order to avoid the expanding of agglomerates. Accordingly, it is provided in a preferred embodiment of the method according to the invention that the material is dispersed in the amount of air, preferably before the material enters the furnace shaft.

The dispersion can be carried out in different ways. For example, it would be conceivable to subject the material in the amount of air to ultrasound to disperse the material.

A particularly simple and elegant method is to use the amount of air itself for dispersing. For a good dispersion result, it must merely be ensured that the amount of air flows at a sufficiently high speed, which is why the use of compressed air is preferably provided, which simultaneously forms the amount of air. A particularly compact design can be realized when the compressed air and the material are passed through a solid/air nozzle. Accordingly, in a preferred embodiment of the method according to the invention, it is provided that the dispersion takes place by means of compressed air in a solid/air nozzle, preferably with a downstream diffuser, connected to the furnace shaft.

Analogously, it is provided in a preferred embodiment of the device according to the invention that the at least one feeding means comprises a solid/air nozzle, to which compressed air and the unexpanded material can be supplied to disperse the material in the amount of air. This means that the amount of air is eventually made available by means of the nozzle and injected into the furnace shaft. Furthermore, it is provided in a particularly preferred embodiment of the device according to the invention that the device further comprises a diffuser, which is connected downstream of the solid/air nozzle and connects to the lower end of the furnace shaft. In order to achieve a particularly good dispersing result and to allow an optimal transition of the dispersed material into the furnace shaft, it is provided in a particularly preferred embodiment of the device according to the invention that the diffuser connects with a radial clear end cross-section to the lower end of the furnace shaft, which is equal to a radial clear inlet cross-section of the furnace shaft at the lower end.

The air flow can ensure that no expanded material remains in the furnace shaft. For this purpose, it is usually sufficient to dimension the amount of air, by taking into account the furnace shaft cross-section, in such a way that it is ensured that the as yet unexpended sand which is dispersed in the air flow does not fall back in an unstable manner against the air flow. Accordingly, it is provided in a preferred embodiment of the method according to the invention that the amount of air is dimensioned and fed in such a way that the supplied material in the furnace shaft does not drop downwardly against the air flow. The heating of the air and the sand grains in the furnace shaft and the expanding of the sand grains to microspheres ensure that the latter do not remain in the furnace shaft, but are discharged together with the air from the furnace shaft. Therefore, it is provided in a preferred embodiment of the method according to the invention that the discharge of the expanded material takes place together with heated air in the furnace shaft in a gas-material stream. The presence of a gas-material streams does not mean that the air has to flow as fast as the material. As a rule, the air flows faster, so that there is a relative velocity between the gas and the material, wherein this relative speed usually decreases along the conveying path, i.e. further down in the furnace shaft the relative speed is usually greater than above.

In order to further improve the method according to the invention, a boundary layer flow can further be considered in the described dimensioning of the amount of air, which inevitably forms by itself in a region near an inner wall of the furnace shaft with a certain radial extension. Accordingly, it is provided in a preferred embodiment of the method according to the invention that, the amount, of air is dimensioned and supplied in such a way that, at an upper end of the furnace shaft, an average velocity of the air flow lies in a range of 50% to 95% of a maximum velocity of a boundary layer flow, wherein the boundary layer flow is formed by the air flow in the region of an inner wall radially delimiting the furnace shaft and has a concentration of material which is increased relative to the remaining air flow, and wherein the average velocity of the air flow is obtained by averaging the velocity of the air flow radially from a radial center of the furnace shaft to the inner wall. As a result of this configuration of the amount of air or air flow, a caking of the sand grains on the inner wail can be virtually completely excluded. Another advantage of this configuration of the amount of air or air flow is the resulting optimum dwell time of the material in the furnace shaft, which avoids too early expansion and the risk of overexpansion. Optionally, the expansion can he displaced in the direction of the furnace shaft end, i.e. upwardly, by slightly increasing the amount of air in order to further minimize the risk of overexpansion.

It should be noted that the furnace shaft does not necessarily have to be shaped in a rotationally symmetrical manner and yet still may have a radial center, which is a center of the clear cross-section of the furnace shaft transversely, preferably normally to the conveying direction. The radially delimiting inner wall surrounds this clear cross-section.

In order to facilitate further processing or to facilitate handling of the expanded material, it is provided in a preferred embodiment of the method according to the invention that cooling air is added to the gas-material stream, in order to cool the expanded material. For example, this simplifies the easy separation of the expanded, material in a filter and/or the safe storage of the expanded material in a reservoir.

Analogously, it is provided in a preferred embodiment of the device according to the invention that at least one cooling air supply means is provided to supply cooling air to the gas-material stream emerging at the upper end of the furnace shaft for the purpose of cooling the expanded material. The at least one cooling air supply means typically comprises a supply line for the cooling air and a nozzle, into which the supply line opens and with which the cooling air is injected into the gas-material stream.

In order to further process the expanded material or the microspheres, in particular to pack and/or store them, it is provided in a preferred embodiment of the method according to the invention that the expanded material is separated from the gas-material stream by means of a filter.

Analogously, it is provided in a preferred embodiment of the device according to the invention that a filter is provided to separate the expanded material from a gas-material stream emerging from the upper end of the furnace shaft.

In a particularly preferred embodiment of the method according to the invention, it is provided that the separation takes place by means of the filter, after the expanded material has been cooled to a processing temperature, wherein the processing temperature is preferably less than or equal to 100° C. This allows a cost-effective design of the filter, since the requirements for the materials of the filter can be lowered in terms of heat resistance.

Analogously, it is provided in a particularly preferred embodiment of the device according to the invention that the at least one cooling air supply means is connected upstream of the filter.

In a preferred embodiment of the method according to the invention, it is provided that after discharge the size and/or density of the expanded sand grains are determined. This makes it possible to determine and/or adapt process parameters, e.g. the temperature to be heated or the supplied amount of material and air or the average velocity of the air flow in the furnace shaft, depending on the result of the measurement of the size and density of the expanded material. In this way, an automatic control, in particular, can be carried out in order to ensure the desired quality of the microspheres produced.

Analogously, it is provided in a particularly preferred embodiment of the device according to the invention that means for determining the size and/or density of the expanded sand grains are provided. Corresponding sensors, e.g. for the optical determination of size and density, are principally available on the market.

In particular, the desired size of the microspheres produced can be ensured in this way, wherein expanded sand grains having a diameter of less than or equal to 150 μm are typically understood to be microspheres. Accordingly, it is provided in a preferred embodiment of the method according to the invention that the expanded sand grains have an average diameter less than or equal to 150 µm, preferably less than or equal to 100 µm, more preferably less than or equal to 75 µm.

It should be noted that for regulating or setting the process parameters even further control measurements can be performed additionally or alternatively. For example, optical sensors can be used to perform an automated optical inspection of the surface quality of the microspheres produced to determine if they are open or closed.

BRIEF DESCRIPTION OF THE DRAWINGS

The invention will now be explained in more detail with reference to an embodiment. The drawings are provided by way of example and are intended to explain the concept of the invention, but in no way restrict it or even render it conclusively, wherein.

DETAILED DESCRIPTION OF THE PREFERRED EMBODIMENTS

Figure 1:
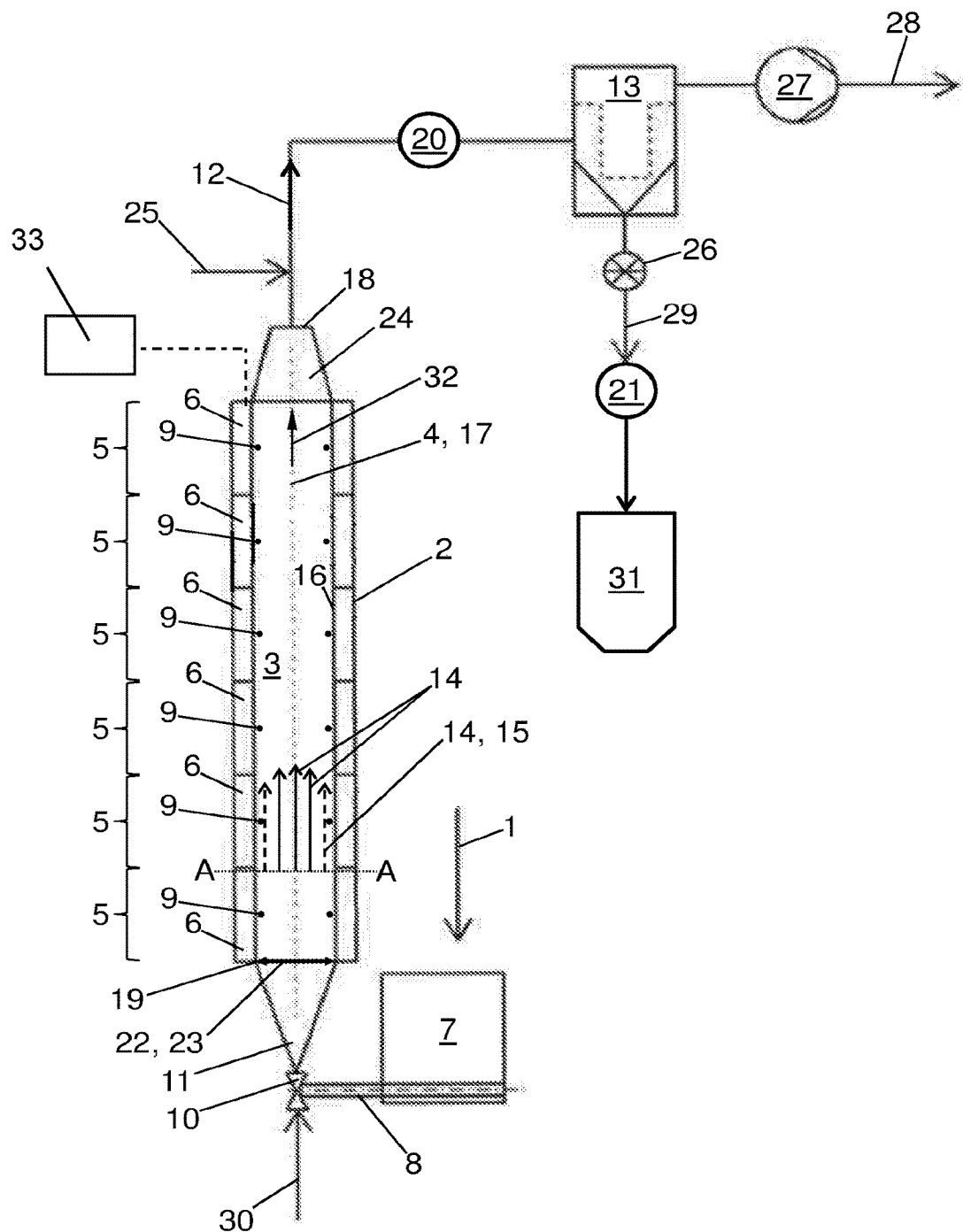
FIG. 1 shows a schematic representation of a device according to the invention in a flow chart of the method according to the invention.

FIG. 1 shows a schematic representation of a device according to the invention, with which a method according to the invention, for producing expanded microspheres 29 or respectively an expanded granulate 29 can be carried out. Starting material for the expanded microspheres 29 is a sand-like or dust-like material with a propellant. In the exemplary embodiment shown, perlite sand 1 is assumed to be the material, wherein water is bound in perlite, which acts as a propellant during the expansion process.

To carry out the expansion process, the device according to the invention comprises a furnace 2 with a furnace shaft 3 which extends vertically from a lower end 19 to an upper end 18 from bottom to top. A conveying path 4 extends between the ends 19, 18, which path is indicated in FIG. 1 by a dashed line. This line simultaneously marks a radial center 17 of the furnace shaft 3. In the furnace 2, a plurality of heating zones 5 arranged one above the other or as viewed in a conveying direction 32 are provided, through which the conveying path 4 passes. Each heating zone 5 is provided with at least one independently controllable heating element 6, which can concern an electric heating element 6 for example. By means of the heating elements 6, the perlite sand 1 in the furnace 2 or furnace shaft 3 can be brought to a critical temperature, at which the surfaces of the perlite sand grains 1 become plastic and the perlite sand grains 1 are expanded due to the propellant, which is water vapor in this case.

According to the invention, the perlite sand 1, together with an amount of air, is supplied at the lower end 19 into the furnace 2 or furnace shaft 3 and injected in the direction of the upper end 18, i.e. from bottom to top. For this injection, a solid/air nozzle 10 is provided. Said nozzle is supplied on the one hand with the perlite sand 1, which is stored in a fine sand container 7, via a metering screw 8. On the other hand, the solid/air nozzle 10 is supplied with compressed air 30. The solid/air nozzle 10 ensures that a downwardly flowing air flow 14 is formed, by means of which the perlite sand 1 is conveyed from bottom to top along the conveying path 4 in the conveying direction 32. As a result of the conveying from bottom to top, it is prevented that the resulting buoyancy forces cause the dwell time of the perlite sand 1 or the expanded granulate 29 to become uncontrollably long in the furnace shaft 3. At the same time, it can be ensured that the expanding takes place only in the upper half, preferably in the uppermost third, of the furnace shaft 3 or the conveying path 4, whereby caking of the perlite sand 1 or the expanded granulate 29 on an inner wall 16 of the furnace shaft 3 can be avoided as well as gluing of individual grains of perlite sand 1 and the expanded granulate 29 to each other.

Typically, the perlite sand 1 has approx. 780° C. directly before its expanding. Since the expanding process, in which the perlite sand grains 1 expand, is an isenthalpic process, the perlite sand 1 cools down during expanding, typically to about 590° C., which is also referred to as the temperature drop. Depending on the material, the temperature drop is at least 20° C., preferably at least 10020 C. A detection of the temperature drop or the detection of the position at which the temperature drop occurs in the furnace shaft 3 makes it possible to regulate the heating elements 6 along the remaining conveying path 4 in a targeted manner, in particular to influence the surface structure or surface properties of the expanded granulate 29.

Correspondingly, a plurality of positions 9 for a temperature measurement is provided along the conveying path 4 in order to be able to determine the position of the temperature drop. In this case, no absolute temperature measurement takes place in the present exemplary embodiment, but the power consumption of the heating elements 6 is determined, or it is determined how this power consumption changes along the conveying path 4. Immediately after the expansion process and the concomitant temperature drop, the temperature difference between the expanded granulate 29 and the heating elements 6 is significantly greater than between the perlite sand 1 and the heating elements 6 immediately before the expansion process. Accordingly, the heat flow also increases. This means that the observed change in the heat flow or the power consumption of the heating elements 6 from one heating zone 5 to the next is an increase, whereas due to the successive heating of the pearlite sand 1 before the expansion process, the change in power consumption along the conveying path 4 is a decrease.

For control purposes, in particular for control along the conveying path 4 that remains after the temperature drop, the heating elements 6 are connected to a regulation and control unit 33 so that an increase in the material temperature along the remaining conveying path 4 at or above the critical temperature can be selectively prevented or permitted.

The microspheres 29 thus produced have a diameter less than or equal to 150 µm. In order to actually obtain individual microspheres 29 in the end product and not too large particles in the form of agglomerates of microspheres 29, the perlite sand 1 in the furnace shaft must be prevented from forming agglomerates which are then expanded into corresponding agglomerates of microspheres 29. Agglomeration of perlite sand 1 is promoted by moisture. Therefore, the perlite sand 1 is treated before it enters the fine sand container 7, wherein the preparation includes a drying process. However, since even in the dry state the transport of the fine dusty perlite sand 1 is hardly possible without the formation of agglomerates, the perlite sand 1 is dispersed in the amount of air with which it is fed into the furnace shaft 3.

The dispersing is curried out in the embodiment shown by means of the solid/air nozzle 10. In addition, a diffuser 11 is provided which connects on the one hand to the solid/air nozzle 10 and on the other hand to the lower end 19 of the furnace shaft 3. The diffuser 11 has a clear radial cross-section, which expands, as seen in the conveying direction 32, to a radial end section 22. The radial end cross-section 22 is the same size as a radial inlet cross-section 23 of the furnace shaft 3 at the lower end 19, which allows an optimal transition of the dispersed perlite sand 1 from the diffuser 11 into the furnace shaft 3.

After the expanding process, the expanded granulate 29, together with the air heated in the furnace shaft 3, is discharged at the upper end 18 of the furnace shaft 3 after passing through an end section 24 of the furnace shaft 3. This means that the microspheres 29 are present in a gas-material stream 12.

Via a feed line 25, cooling air is added the gas-material stream. 12 after it has emerged from the furnace shaft 3. As a result, the expanded granulate 29 is cooled, preferably to a processing temperature less than or equal to 100° C., which facilitates the further handling of the expanded granulate 29, in particular during its further processing.

The gas-material stream 12 is supplied to a particle size measuring device 20 to determine the size of the microspheres 29.

Subsequently, the gas-material stream 12 is fed to a filter 13 in order to separate the expanded granulate 29 from, the gas-material stream 12. Exhaust air 28 filtered through the filter 13 is discharged via a fan 27 downstream of a filter 13 to the atmosphere.

By contrast, the separated expanded granulate 29 is first fed via a rotary valve 26 connected downstream of the filter 13 to a density measuring device 21, in which the density of the expanded granulate 29 is determined before it is conducted into a silo 31.

Known devices can be used both as a particle size measuring device 20 and as a density measuring device 21, which operate for example on the basis of optical sensors.

The determination of the particle size and the density of the expanded granulate 29 allows setting process parameters such as the temperature or temperature distribution in the furnace shaft 3 or along the conveying path 4, or the amount of perlite sand 1 or the supplied amount of air, depending on the measurement results of the measuring devices 20, 21. In particular, automatic control can thus be carried out to set the desired quality, in particular the desired size and density, of the microsphere 29. For example, the regulation and control unit 33 can be provided to process the measurement results of the measuring devices 20, 21 and to regulate the process parameters accordingly.

The process parameters also include the velocity v of the air flow 14 in the furnace shaft 3. It should be noted that in an area near the inner wall 16, a boundary layer flow 15 of the air flow 14 is formed, which boundary layer flow 15 has a specific radial extension. The boundary layer flew 15 is characterized in that in comparison with the remaining air flow 14 it contains an increased concentration of perlite sand 1 and microsphere 29.

Figure 2:
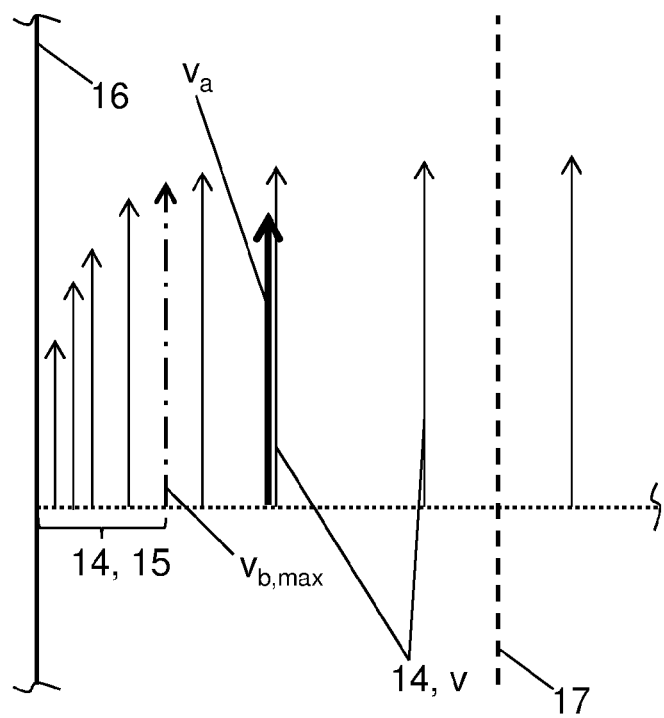
FIG. 2 shows a diagram of a velocity distribution of an air flow in a furnace shaft according to the line of intersection A-A in FIG. 1.

FIG. 2 illustrates the flow conditions along a radial section through the furnace shaft 3 according to the line of intersection A-A in FIG. 1. It can be recognized that the velocity v in the boundary layer flow 15 initially increases significantly from the inner wail 16 in the direction towards the radial center 17 to a maximum velocity $v_{b,max}$ of the boundary layer flow 15 (indicated in FIG. 2 by the dot-dashed arrow). Further toward the radial center 17, the velocity v does not increase or, as shown in FIG. 2, increases only slightly. If the speed v is averaged from the radial center 17 to the inner wall 16, the result is an average velocity $v_a$, which is symbolized in FIG. 2 by a thick arrow. Extensive experiments have shown that caking of the perlite sand 1 or of the microspheres 29 on the inner wall 16 can be virtually completely ruled out if the air flow 14 is designed or set such that the average speed $v_a$ at the upper end 18 of the furnace shaft 3 is in a range of 50% to 95% of $v_{b,max}$. In the illustrated embodiment, $v_a$ is about 90% of $v_{b,max}$.

In this case, the air flow 14 can be adjusted by suitable choice or design of the solid/air nozzle 10 and/or by selecting a suitable pressure of the compressed air 30. The latter can principally also be carried out automatically by means of the regulation and control unit 33.

LIST OF REFERENCE NUMERALS

1 Perlite sand
 2 Furnace
 3 Furnace shaft
 4 Conveying path
 5 Heating zone
 6 Heating element
 7 Fine sand container
 8 Metering screw
 9 Position for temperature measurement
10 Solid/air nozzle
11 Diffuser
12 Gas-material stream
13 Filter
14 Air flow
15 Boundary layer flow
16 Inner wail
17 Radial center of furnace shaft
18 Upper end of furnace shaft
19 Bottom end of furnace shaft
20 Particle sire measuring device
21 Density measuring device
22 Radial end cross-section of diffuser
23 Radial inlet cross-section of the furnace shaft at its bottom end
24 End section of furnace shaft
25 Feed line for cooling air
26 Rotary valve
27 Fan
28 Purified exhaust air
29 Expanded granulate/microsphere
30 Compressed air
31 Silo
32 Conveying direction
33 control unit
v Velocity of air flow
$v_a$ Average velocity of air flow
$V_{b,max}$ Maximum velocity of boundary layer flow

The invention claimed is:

1. A method for producing an expanded granulate made of a sand grain-shaped mineral material using a propellant; wherein the material is fed to a substantially upright furnace; wherein the material is conveyed along a conveying path through a plurality of vertically separated heating zones in a furnace shaft of the furnace, wherein each heating zone can be heated by at least one independently controllable heating element; wherein the material is heated to a critical temperature at which the surfaces of the sand grains become plastic and the sand grains are expanded through the propellant; wherein the expanded material is discharged from the furnace, characterized in that the material is fed together with an amount of air from below, wherein the material is conveyed from bottom to top along the conveying path by means of the amount of air which flows from bottom to top within the furnace shaft and forms an air flow, and wherein the expanding of the sand grains occurs in the upper half of the conveying path.

2. The method according to claim 1, characterized in that upon detection of a first reduction of the temperature of the material between two successive positions along the conveying path the heating elements are controlled along the remaining conveying path depending on the critical temperature in order to prevent or specifically allow an increase in the material temperature along the remaining conveying path to or above the critical temperature,
wherein a temperature change of the material along the conveying path is measured directly via temperature sensors.

3. The method according to claim 1, characterized in that upon detection of a first reduction of the temperature of the material between two successive positions along the conveying path the heating elements are controlled along the remaining conveying path depending on the critical temperature in order to prevent or specifically allow an increase in the material temperature along the remaining conveying path to or above the critical temperature,
wherein a temperature change of the material along the conveying path is measured indirectly by determining a power consumption of the heating elements.

4. The method according to claim 1, characterized in that the material is dispersed in the amount of air.

5. The method according to claim 4, characterized in that the dispersion is carried out by means of compressed air in a solid/air nozzle.

6. The method according to claim 5, characterized in that a diffuser, which connects to the furnace shaft, is disposed downstream the solid/air nozzle.

7. The method according to claim 4, characterized in that the material is dispersed in the amount of air before the material enters the furnace shaft.

8. The method according to claim 1, characterized in that the discharge of the expanded material takes place together with air heated in the furnace shaft in a gas-material stream.

9. The method according to claim 8, characterized in that cooling air is added to the gas-material stream in order to cool the expanded material.

10. The method according to claim 9, characterized in that the expanded material is separated from the gas-material stream by means of a filter after the expanded material has been cooled to a processing temperature.

11. The method according to claim 10, characterized in that the processing temperature is preferably less than or equal to 100° C.

12. The method according to claim 8, characterized in that the expanded material is separated from the gas-material stream by means of a filter.

13. The method according to claim 1, characterized in that the amount of air is dimensioned and supplied in such a way that the supplied material in the furnace shaft does not fall downwardly against the air flow.

14. The method according to claim 1, characterized in that the amount of air is dimensioned and supplied in such a way that at an upper end of the furnace shaft an average velocity ($v_a$) of the air flow lies in a range of 50% to 95% of a maximum velocity ($v_{b,max}$) of a boundary layer flow, wherein the boundary layer flow is formed by the air flow in the region of an inner wall radially bounding the furnace shaft and has an increased concentration of material compared to the remaining air flow, and wherein the average velocity ($v_a$) of the air flow is determined by averaging the velocity ($v$) of the air flow radially from a radial center of the furnace shaft to the inner wall.

15. The method according to claim 1, characterized in that the size and/or the density of the expanded sand grains is determined and that process parameters are adapted depending on the size and/or density of the expanded sand grains, so that the expanded sand grains have an average diameter less than or equal to 150 µm.

16. The method according to claim 15, characterized in that the expanded sand grains have an average diameter less than or equal to 75 µm.

17. The method according to claim 1, characterized in that the size and/or density of the expanded sand grains is determined after the expanded sand grains are discharged from the furnace shaft.

18. The method according to claim 1, wherein the expanded granulate is produced from perlite sand or obsidian sand.

19. The method according to claim 1, characterized in that the expanding of the sand grains occurs in the uppermost third of the conveying path.

20. A device for producing an expanded granulate made of a sand grain-shaped material, comprising a substantially upright furnace with a furnace shaft having an upper end and a lower end, wherein a conveying path extends between the two ends and passes through a plurality of vertically separated heating zones wherein the heating zones each have at least one independently controllable heating element to heat the material to a critical temperature and to expand the sand grains, characterized in that at least one feeding means is provided in order to inject the unexpanded material together with an amount of air at the bottom end of the furnace shaft in the direction of the upper end of the furnace shaft into the furnace shaft in such a way that the amount of air forms an upwardly flowing air flow, by means of which the material is conveyed from bottom to top along the conveying path in order to be expanded in the upper half of the conveying path.

21. The device according to claim 20, characterized in that material temperature measuring means for direct and/or indirect measurement of the temperature and/or the temperature change of the material are provided, as well as a regulation and control unit, which is connected to the material temperature measuring means and the heating elements of the heating zones, in order to detect a first reduction of the temperature of the material between two successive positions along the conveying path, and that the heating elements can be controlled by the regulation and control unit depending on the critical temperature in order to prevent or specifically allow an increase in the material temperature along the remaining conveying path to or above the critical temperature.

22. The device according to claim 21, characterized in that the first reduction of the temperature of the material is at least 20° C.

23. The device according to claim 20, characterized in that the at least one feeding means comprises a solid/air nozzle, to which compressed air and the unexpanded material can be fed in order to disperse the material in the amount of air.

24. The device according to claim 23, characterized in that the device further comprises a diffuser which is provided downstream of the solid/air nozzle and is connected to the lower end of the furnace shaft.

25. The device according to claim 24, characterized in that the diffuser is connected to the lower end of the furnace shaft with a radial clear end cross-section, which is equal to a radial clear inlet cross-section of the furnace shaft at the lower end thereof.

26. The device according to claim 20, characterized in that a filter is provided in order to separate the expanded material from a gas-material stream emerging at the upper end from the furnace shaft.

27. The device according to claim 20, characterized in that at least one cooling-air feeding means is provided in order to supply cooling air for cooling the expanded material to the gas-material stream emerging at the upper end from the furnace shaft.

28. The device according to claim 27, characterized in that a filter is provided in order to separate the expanded material from a gas-material stream emerging at the upper end from the furnace shaft, wherein the at least one cooling-air feeding means is connected upstream of the filter.

29. The device according to claim 20, characterized in that means for determining the size and/or the density of the expanded sand grains are provided.

30. The device according to claim 20, characterized in that the material is conveyed from bottom to top along the conveying path by means of the upwardly flowing air flow in order to be expanded in the uppermost third of the conveying path.

* * * * *